Figure 1:
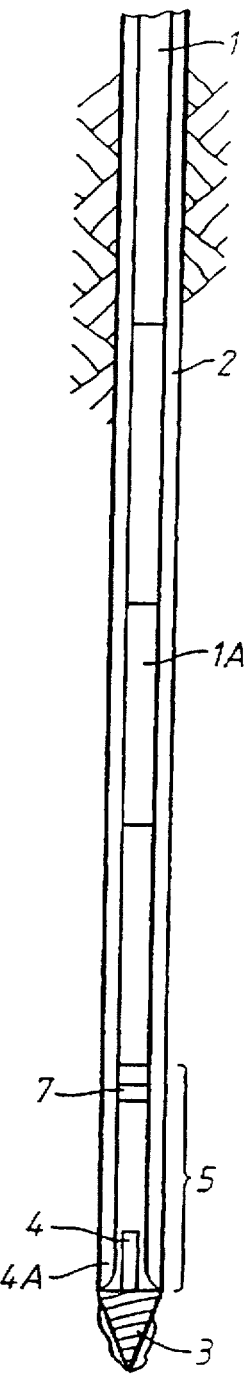

United States Patent [19]
Beresford et al.

[11] Patent Number: 5,798,488
[45] Date of Patent: Aug. 25, 1998

[54] ACOUSTIC SENSOR

[75] Inventors: John M. Beresford, Sherbourne; Paul A. Crowther, London, both of United Kingdom

[73] Assignee: GEC Marconi Limited, United Kingdom

[21] Appl. No.: 716,137

[22] PCT Filed: Mar. 27, 1995

[86] PCT No.: PCT/GB95/00684

§ 371 Date: Nov. 11, 1996

§ 102(e) Date: Nov. 11, 1996

[87] PCT Pub. No.: WO95/27222

PCT Pub. Date: Oct. 12, 1995

[30] Foreign Application Priority Data

| Mar. 30, 1994 | [GB] | United Kingdom | 9406378 |
| Apr. 25, 1994 | [GB] | United Kingdom | 9408139 |
| Jan. 6, 1995 | [GB] | United Kingdom | 9500250 |

[51] Int. Cl.[6] ............................................. G01V 1/40
[52] U.S. Cl. .......................... 181/102; 181/106; 181/108; 181/113; 73/152.03; 73/152.16; 175/50
[58] Field of Search .................................. 181/102, 106, 181/108, 113; 73/152.03, 152.16; 175/40, 50

[56] References Cited

U.S. PATENT DOCUMENTS

| 4,207,619 | 6/1980 | Klaveness | 181/106 |
| 4,991,685 | 2/1991 | Airhart | 181/106 |
| 5,248,857 | 9/1993 | Ollivier | 181/102 |
| 5,309,405 | 5/1994 | Brett et al. | 181/113 |

FOREIGN PATENT DOCUMENTS

| 2 661 511 | 10/1991 | France . |
| WO 93/07514 | 4/1993 | WIPO . |

Primary Examiner—J. Woodrow Eldred
Attorney, Agent, or Firm—Kirschstein, et al.

[57] ABSTRACT

An acoustic sensor for use as part of a drill string in a borehole has an acoustic transducer which vibrates the drill bit in contact with the rock at the end of the borehole to generate acoustic signals in the rock. These acoustic signals propogate through the rocks ahead of the drill bit and are reflected and scattered to return to an acoustic sensor contained within the drill string.

35 Claims, 7 Drawing Sheets

1
ACOUSTIC SENSOR

BACKGROUND OF THE INVENTION

This invention relates to drilling apparatus.

When drilling, and particularly when drilling for oil, it is desirable to know what strata will be drilled through at any time in order to allow appropriate drilling parameters to be employed, it is also desirable to have a detailed knowledge of the position of the drill bit relative to anticipated or known features of the rock strata and to allow geosteering. One particular concern in oil drilling is the identification of over pressure regions in the strata ahead of the drill in order to allow the fluid pressure within the borehole to be adjusted to the minimum safe level. Having the minimum safe fluid pressure is desirable because although too low a borehole fluid pressure, known as underbalancing, produces the danger that is a gas overpressure region is penetrated the resulting release of gas into the borehole, known as a blowback, can result in loss of the borehole and drill rig, too high a fluid pressure, known as overbalancing, can damage the borehole and reduce its oil production capability.

Thus in operation it is necessary to balance the risks of under or over balancing the borehole fluid pressure and to do this accurate data on the presence of overpressure regions is needed.

There have been two general approaches to this problem, the first has been the use of seismic surveying from the surface to map underground geological features combined with the use of inertial and magnetic sensors near to the drill bit and dead reckoning to allow the position of the drill bit relative to these features to be tracked. Unfortunately this approach suffers from the drawback that the range accuracy and spatial resolution of geological features deep underground obtained by using surface based surveying is very low due to the distances involved and the fact that the speed of soundwaves through underground strata is dependent on their makeup. The second approach has been to place acoustic and other surveying instruments inside the drill string in order to sense the rock strata around the drill during the drilling operation. This is generally termed "measurement while drilling" or "MWD" although in practice the actual drilling operation may be paused while measurements are being taken. This approach suffers from the drawback that although the rock strata around the drill can be sensed this information must then be used to deduce what geological formations are ahead of the drill bit.

A variation on this second technique is disclosed in WO 93/07514, in which the drill bit itself is used as a noise source whilst the drill bit is actually rotating.

As a result there is always considerable uncertainty in such systems regarding the makeup of the formations directly ahead of the drill bit since it is not always possible to accurately deduce or extrapolate what these formations will be.

It would of course also be possible to extract the entire drill string from the borehole and send down a wire line tool including an acoustic sensor which would acoustically survey through the bottom of the borehole to directly survey the rock formations beyond, but the time and cost penalties associated with extracting the drill string to do this are very high compared with a MWD survey conducted directly from the drill string, so this is an undesirable procedure.

This invention was intended to produce an acoustic sensor within the drill string overcoming these problems, at least in part.

The present invention provides drilling apparatus comprising a drill bit, an acoustic transducer for generating acoustic signals in rock about a borehole formed by the drill bit, and means for receiving acoustic signals returned from the rocks, characterised in that the acoustic transducer is connected to the drill bit such that the transducer generates acoustic signals in the rock ahead of the drill bit by vibrating the drill bit.

Preferrably a compliant device is provided for connecting a drill tool and the drill bit including an acoustic sensor to a drill collar and having a compliance such that the resonant frequency produced by the compliance and the mass of the drill tool and drill bit is substantially lower than the passband frequency of the acoustic sensor.

Figure 2A:
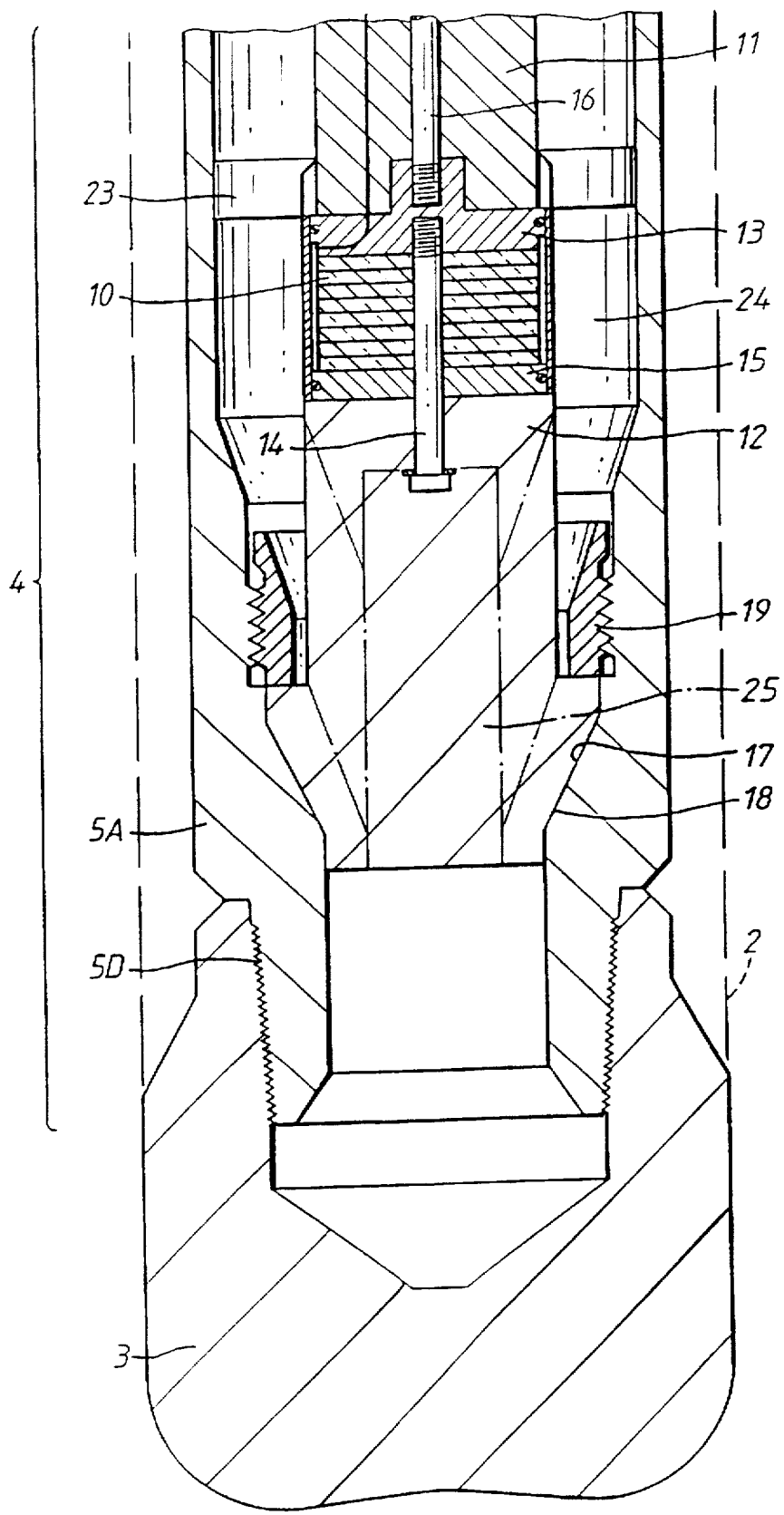
Figure 2B:
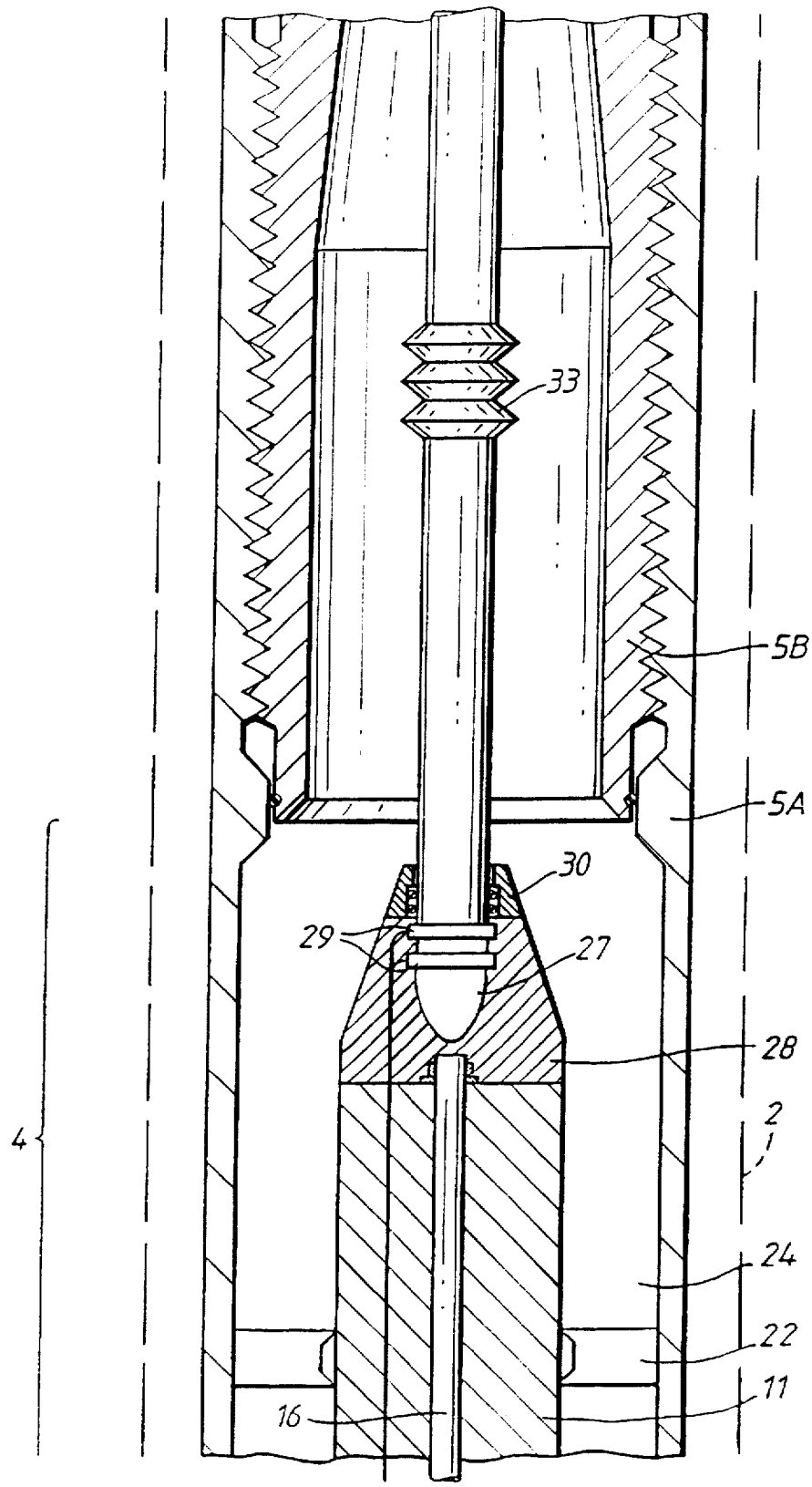
Figure 2C:
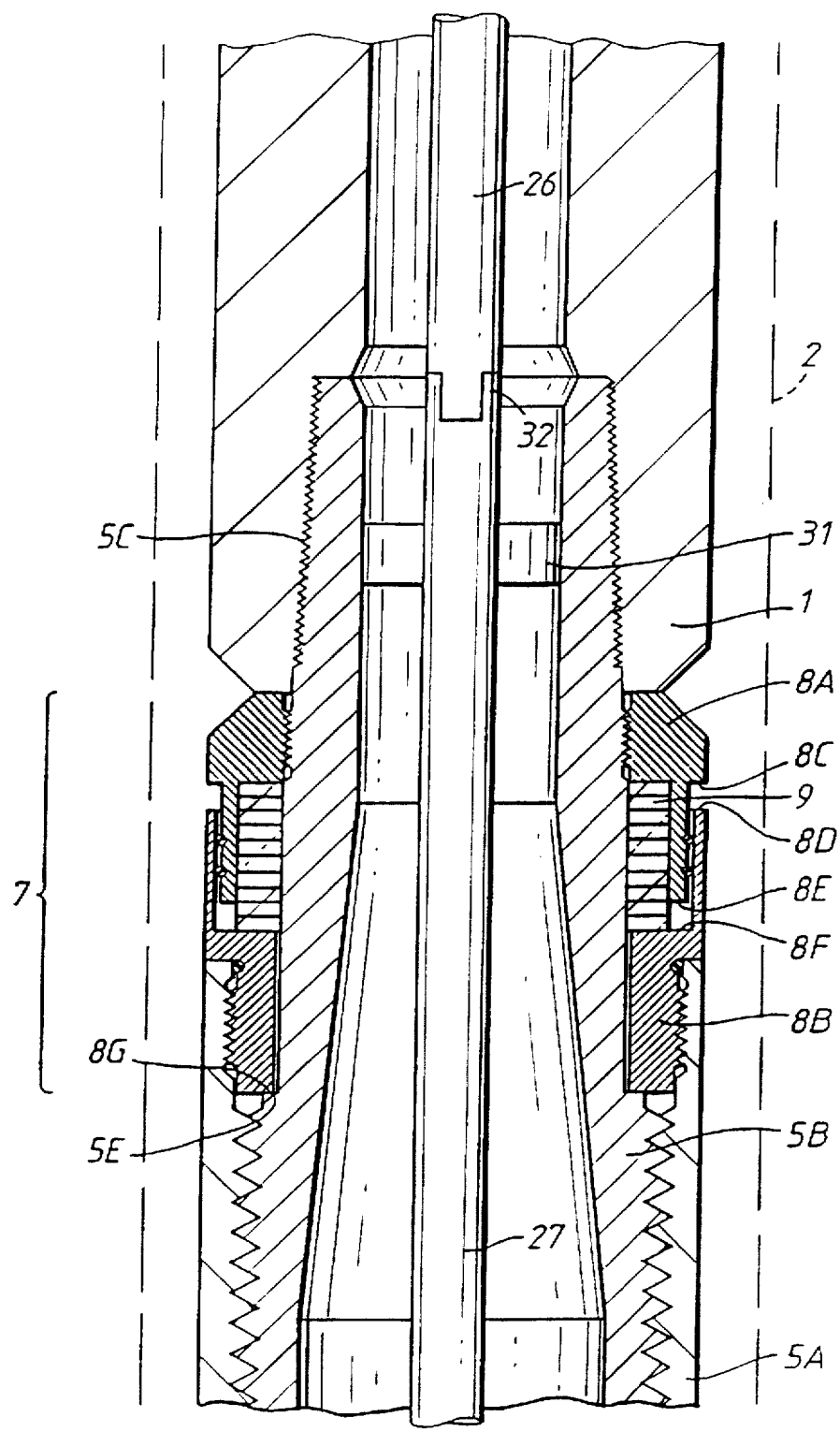
Figure 3A:
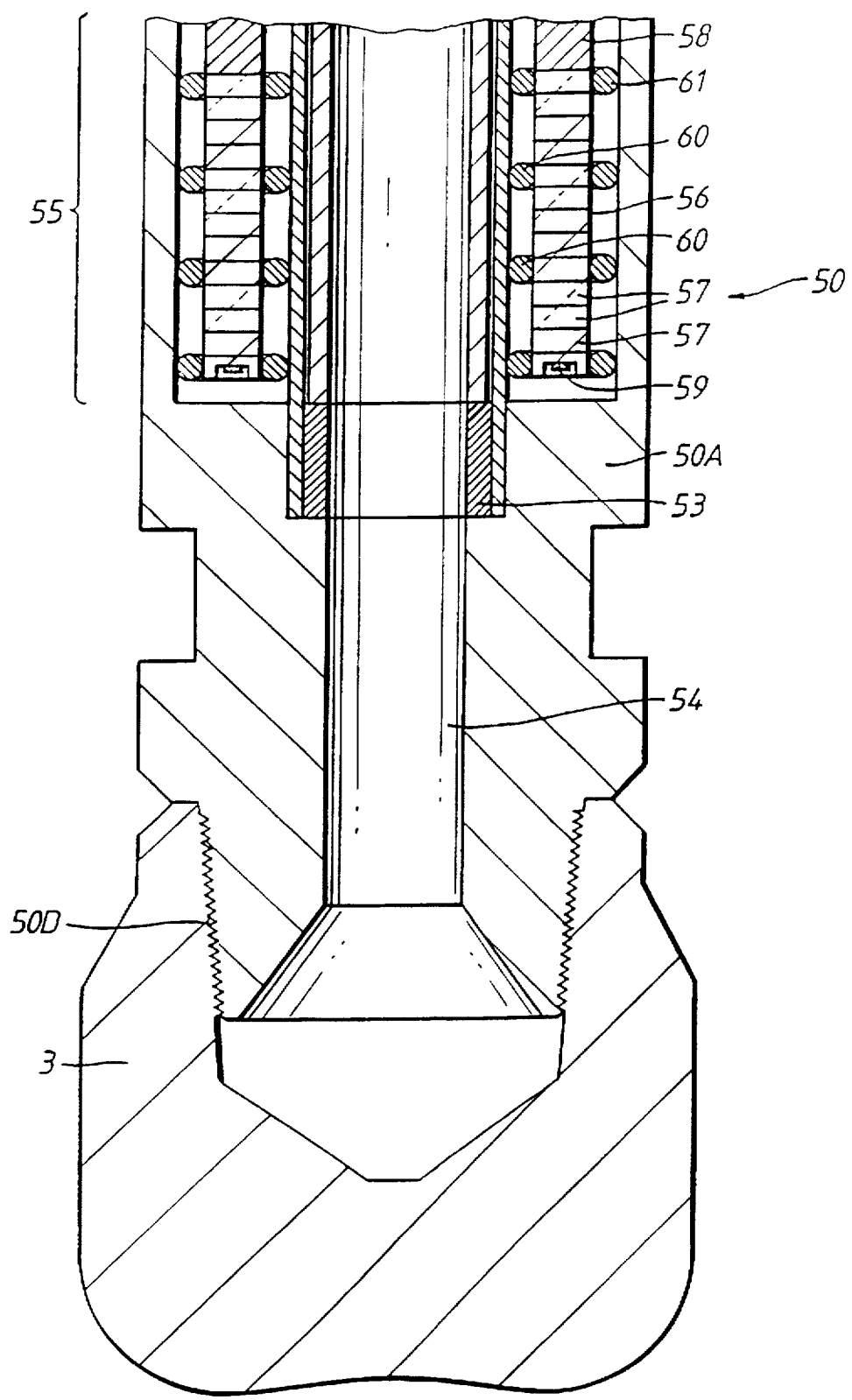
Figure 3B:
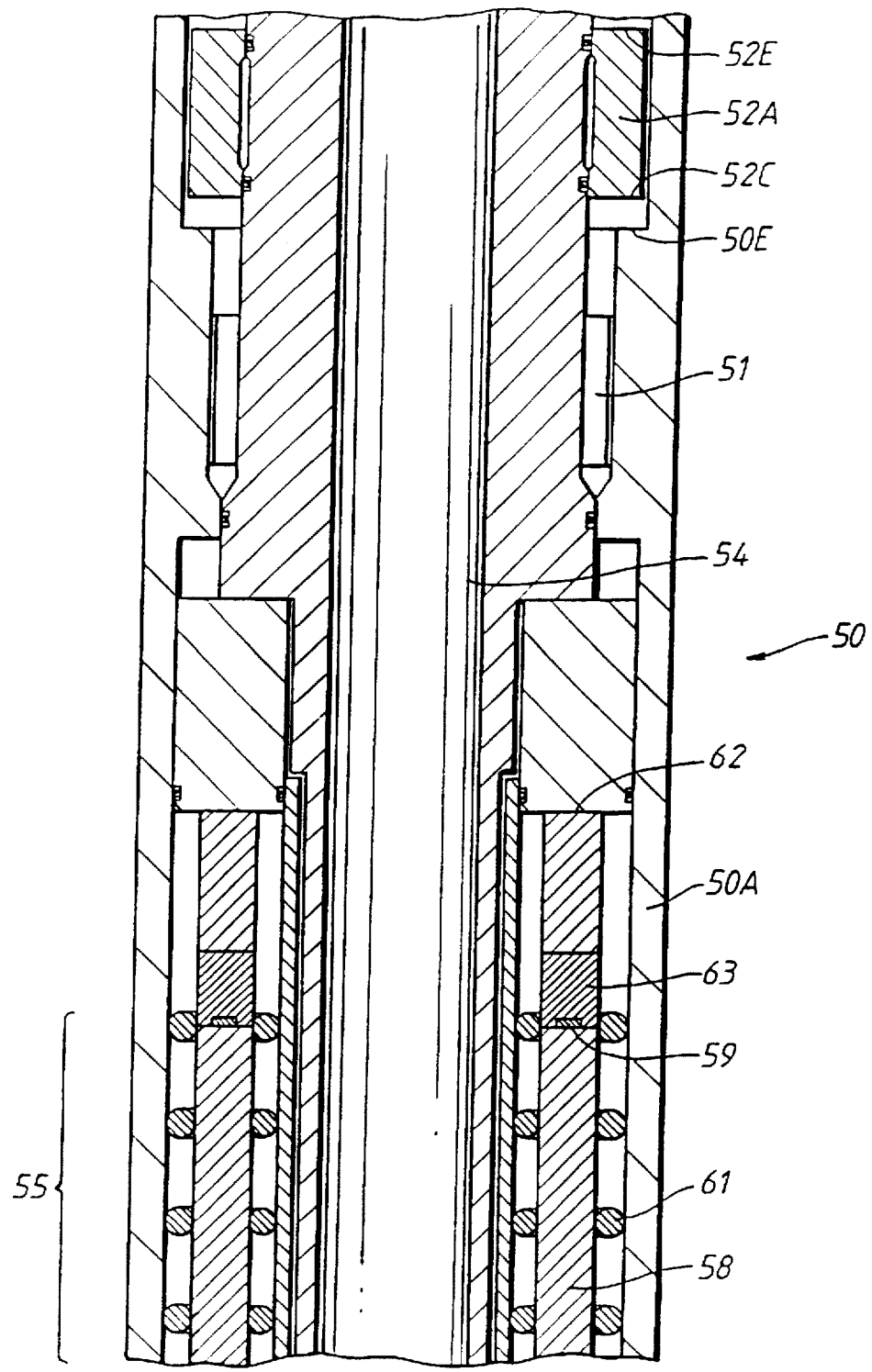
Figure 3C:
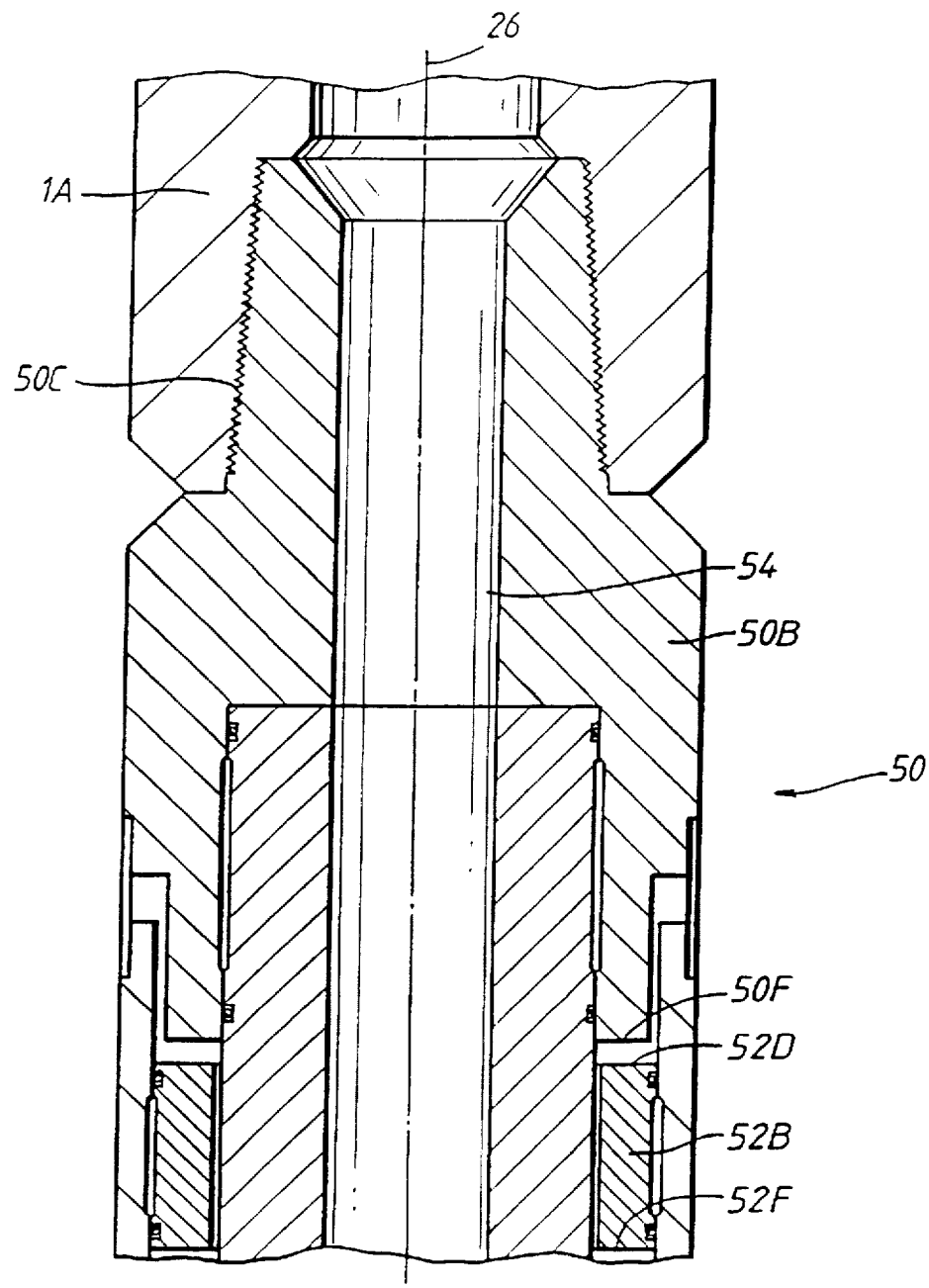

Apparatus employing the invention will now be described by way of example only with reference to the accompanying diagrammatic figures in which:

FIG. 1 shows a general view of the lower end of a first design of a drill employing the invention, FIG. 2a shows a more detailed view of a first part of the view of FIG. 1, FIG. 2b shows a more detailed view of a second part of the drill of FIG. 1, FIG. 2c shows a more detailed view of a third part of the drill of FIG. 1, FIG. 3a shows a detailed view of a first part of the lower end of the drill enplolying a second embodiment of the invention, FIG. 3b shows a detailed view of a second part of the drill of FIG. 3a, and FIG. 3c shows a detailed view of a third part of the drill of FIG. 3a, identical parts having the same reference numerals throughout.

Referring to FIG. 1 the lower end of a drill string 1 situated within a borehole 2 and made up of a plurality of screwed together sections is shown.

The drill string is illustrated and described as it would appear when drilling vertically downwards but the drill could of course be operated in other orientations such as in deviated drilling for horizontal wells.

At the lower end of the drill string 1 is an MWD drill collar 1A. The drill collar 1A comprises a plurality of drill pipe sections at the lower end of the drill string 1 as is conventional, at the bottom of the drill collar 1A is a drill bit 3 attached to the drill collar 1A and drill string 1 by a modified drill collar section forming a measurement while drilling, (MWD) tool 5. In order to allow acoustic sensing of the rock strata ahead of the drill bit 3 an acoustic transducer 4 is mounted in close proximity to the drill bit 3 at the base of the MWD tool 5. Since the drill bit 3 is an item which is used until the cutting edge dulls and then is sent back to the supplier for refurbishment it is preferred to make the acoustic transducer 4 part of the MWD tool 5 rather than the bit 3, however it would be possible to make the acoustic transducer 4 part of the drill bit 3 to provide the most direct acoustic path into the rock in order to provide the optimum coupling.

During drilling the acoustic transducer 4 does not operate and the drill bit 3 is rotated while being urged against the end of the borehole 2 with a weight on bit (WOB) provided by the weight of the drill string 1, primarily by the drill collar 1A. This WOB is controlled by the driller as normal. Because of the very high acoustic noise levels generated by the drilling operation in the rock strata and along the drill string 1 it is preferred not to attempt to use the acoustic transducer 4 while actual drilling is going on. When acoustic sensing of the rock strata ahead of the drill bit 3 is desired drilling is paused and the part of the MWD tool 5 which contains the acoustic transducer 4 and drill bit 3 is separated acoustically from the remainder of the drill collar 1A and drill string 1 by compliant section 7 of the MWD tool 5 while the drill bit 3 is loaded against the end of the borehole 2 with a specified WOB. This specified WOB will generally be less than the maximum allowable WOB used for actual drilling.

The acoustic transducer 4 then vibrates generating soundwaves through the rock because of the direct acoustic coupling between the acoustic transducer 4 through the drill bit 3 to the rock. These acoustic waves travel through the rock strata below the bottom of the borehole, are reflected and scattered and then received by the acoustic transducer 4. The characteristics of the rock strata can then be deduced from the type, amplitude and timing of these received signals.

Alternatively or in addition a dedicated receiving section either at or near the drill bit or further up the drill collar 1A and including an acoustic transducer or a detector array formed by a plurality of acoustic transducers, and/or vibration sensitive devices clamped to the well wall, as known in the current art for wire logging tools, could be employed. It is preferred to use a piezo-ceramic stack as acoustic transducer for both transmitting and receiving.

The compliant section 7 of the MWD tool 5 which allows the WOB to be varied as required for acoustic sensing acts as an acoustic isolator between the acoustic transducer 4 and the drill collar 1A and drill string 1 reducing the amount of unwanted acoustic energy transmitted along the drill string 1. In order to do this the compliance of the compliant section must be such that the resonant frequency caused by the mass suspended from the compliant section and the compliance of the compliant section is substantially lower than the passband frequency of the acoustic transducer 4 in contact with expected rock types.

Referring to FIGS. 2A to 2C the measurement while drilling (MWD) tool 5 is shown in detail. The FIGS. 2A to 2C are cross sections through the drill arranged from the bottom of the drill upwards.

The MWD tool 5 is attached by a first conventional conical screw threaded joint 5C at its upper end to the bottom of the drill collar 1A and is attached by a second conventional screw threaded joint 5D at its lower end to the drill bit 3. The MWD tool 5 comprises an outer hollow cylindrical member 5A mounting the drill bit 3 at its lower end by the conventional conical threaded joint 5D and substantially surrounding an inner hollow cylindrical member 5B which is attached to the lower end of the drill collar 1A by the conventional conical screw threaded joint 5C.

The outer and inner hollow cylindrical members 5A and 5B have co-operating longitudinal splines on their inner and outer surfaces respectively allowing them to slide axially relative to one another but still allowing large rotational loads to be transmitted along the drill collar 1 through the two members 5A and 5B to the drill bit 3 during drilling.

In the example illustrated the inner hollow cylindrical member 5B is approximately one half of the length of the outer hollow cylindrical member 5A, these relative lengths could of course be varied depending on the material used to construct the two members and the loads being placed upon them in operation. Further, to allow for a lower internal diameter at the compliance, if required, and for ease of assembly the inner hollow cylindrical member 5B could be formed as two parts.

Relative axial sliding movement of the inner and outer cylindrical members 5A and 5B is limited by a pair of stop rings 8A and 8B. A compression stop ring 8A is attached to the inner member 5B to set the minimum length of the overall MWD tool 5 assembly and an extension stop ring 8B attached to the outer member 5A to limit the maximum length of the overall MWD drill tool 5 assembly. An annular compliant member 9 is mounted between the two stop rings 8A and 8B.

During drilling the weight on bit (WOB) bears on the MWD tool 5, compressing the compliant member 9, and at the upper limits of WOB this compression is such that the compression and extension stop rings 8A and 8B come into contact at co-operating snubbing surfaces 8C and 8D and 8E and 8F. Once the snubbing surfaces 8C and 8E of the compression stop ring 8A are in contact with their respective co-operating snubbing surfaces 8D and 8F of the extension stop ring 8B the maximum drilling load is transmitted between them between the inner and outer members 5A and 5B to the drill bit 3. This snubbing action may either be hard or soft with another suitable compliant interface (not shown) being used if necessary. It would of course be possible to have only one pair of co-operating snubbing surfaces on the stop rings 8A and 8B.

When it is desired to take acoustic measurements the WOB is adjusted by the driller in the usual manner so that the compression and extension stop rings 8A and 8B separate. The WOB of the drill bit 3 is then set by a force generated by the compliant member 9 onto the various elements attached to the drill bit 3 plus the weight of those elements. In order to allow the drill bit 3 and MWD tool 5 to be extracted from the borehole 2, the extension stop ring 8B also has a third snubbing surface 8G which contacts a co-operating snubbing surface 5E on the inner cylindrical member 5B to limit extension of the MWD tool 5.

When extracting the MWD tool 5 and drill bit 3 tensional loads are passed through the snubbing surfaces 8G and 5E to allow the drill string 1 to pull out the MWD tool 5 and attached drill bit 3.

The acoustic transducer 4 is rigidly attached to the outer member 5A of the MWD tool 5. The acoustic transducer 4 comprises a stack of piezoelectric ceramic, commonly termed piezo-ceramic, disks 10, which form the electro-acoustically active part of the transducer 4, a tail mass 11, a stack base 12 and a central disc 13. The central disc 13, stack base 12 and stack 10 are all secured rigidly together by a first bolt 14 passing along their axis and into a threaded hole in the central disc 13, which is tightened to pre-compress the ceramic stack 10 between the disc 13 and a stack end cap 15 placed between the stack 10 and the base 12. The tension of the first bolt 14 is set to ensure that under all operating conditions the ceramic stack 10 is in compression. The tail mass 11 is secured rigidly to the central disc 13 by a second bolt 16 passing along the axis of the tail mass 11 and into a threaded hole in the central disc 13. The stack base 12 has a conical bearing surface 17 on its outer surface and the acoustic transducer 4 is rigidly connected to the outer member 5A by this bearing surface 17 being urged against a corresponding conical bearing surface 18 on the inner surface of the outer member 5A, the two mating bearing surfaces 17 and 18 being urged together by a threaded base ring 19 which co-operates with a threaded inner portion of the outer member 5A. The ceramic stack 10 is surrounded by a cylindrical jacket 20 filled with a non-conductive fluid such as fluorinert. The jacket 20 and tail mass 11 are kept centred within the outer body 5A by a set of spiders 22 and 23 extending between the jacket 20 and tail mass 11 and the inner surface of the outer member 5A. The spiders 22 and 23 are soft in the axial direction to avoid being an acoustic short, stiff in the radial direction to stop shock loads causing the tail mass to break the ceramic assembly and have to transmit loads circumferentially to prevent angular accelerations from drill string windup causing the tail mass 11 to rotate relative to the stack base 12 because this would either loosen or overtighten the bolt 14. The spiders must also allow free passage to the drilling fluid.

During drilling large quantities of drilling fluid (commonly known as drilling mud) are passed down the inside of the drill string 1 under high pressure into the drill bit 3, in order to allow this the outer jacket 20 and tail mass 11 of the acoustic transducer 4 are arranged centrally within the hollow outer member 5A of the drill tool 5 leaving an annular mud passage 24 between them. In order to allow the mud to pass down this mud passage 24 to the drill bit 3 the spiders 22 and 23 are each formed by a plurality of radial vanes with mud gaps between them and the stack base 12 has mud passages 25 through it connecting the annular mud passage 24 to the drill bit 3. The spiders 22 and 23 are also formed by a plurality of vanes to constrain any relative rotational movement of the outer member 5A and the tail mass 11 and jacket 20 by the vanes transmitting loads circumferentially. Such rotational movement could otherwise occur during drilling due to the high torsional loads on the MWD tool 5 and as a consequence of drill string windup.

During acoustic sensing voltages are applied across the ceramic stack 10, causing it to impact a vibrating force on the drill bit 3 and attached masses and the tail mass 11. The system is arranged with a double mechanical resonance such that the drill bit 3 and attached masses resonates with the compliance of the rock while the tail mass 11 resonates with the compliance of the ceramic stack 10. The piezoelectric transducer is also arranged to have an electrical resonance to allow a wide range of operating frequencies and to minimise droop and ripple in the acoustic passband.

Clearly in order to do this is a supply of electrical power is required and a connection to a power supply (not shown) housed in the drill collar 1A is provided along the axis of the drill collar 1A by an electrical cable carrier 26. The electrical cable carrier 26 is formed by a plurality of sections, each within one of the drill pipe sections forming the drill collar 1 and linked by threaded joints. Of course these joints would not be necessary if the power supply were housed in the drill collar section adjacent the MWD tool 5. A probe 27 is mounted within the MWD tool 5 along its axis and the lower end of the probe 27 fits into a socket 28 mounted on the upper end of the tail mass 11 of the acoustic transducer 4.

The power supply is a battery pack, but other systems such as a mud turbine could be used.

The socket 28 contains a pair of slip ring connectors 29 which co-operate with electrical contact pads (not shown) on the outer surface of the probe 27 and the probe 27 is locked inside the socket 28 by a releasable locking mechanism 30. The locking mechanism 30 and rings 29 allow relative rotational movement of the probe 27 and socket 28 during the assembly of the MWD tool 5 and due to torsional loads on the MWD tool 5. The probe 27 is attached to the inner member 5B by a vaned spider 31 and is linked to the electrical cable carrier 26 within the drill collar 1A by a threaded joint 32. A compliant telescopic section 33 of the probe 27 allows the length of the probe 27 to be varied over the same range as the MWD tool 5 and acts as an acoustic break to prevent the probe 27 forming an acoustic path from the transducer 4 to the rest of the drill string 1, whilst maintaining electrical continuity. The compliant telescopic section could of course be part of the socket 28 and vary its length instead of or as well as that of the probe 27.

The acoustic transducer 4 acts as an acoustic receiver as well as a transmitter and the data picked up by the acoustic transducer 4 acting as a receiver is transmitted to a mud pulser (not shown) mounted within the drill collar 1A by the electrical cable carrier 26 and then transmitted to the surface. The data is carried to the electrical cable carrier 26 by the probe 27 and further slip rings (not shown). The data is pre-processed downhole by a processor co-located with the mud pulser to reduce the data rate to a level commensurate with the few bits per second bandwidth capability of the mud pulser data link. Other means of sending the data to the surface could be used such as acoustic signals up the walls of the drill string or extending the electrical cable carrier 26 to the surface.

In addition to the acoustic transducer 4 single axis or triaxial vibration sensors may also be mounted at position 4A in FIG. 1, in this case enough slip rings 29 and contact pads would have to be provided to allow this extra data transmission to the electronic processing contained in MWD drill collar 1A as well as power transmission from the power supply contained in the MWD drill collar 1A. A single axis vibration sensor could be used to receive compression wave signals reflected from rock strata ahead of the drill bit 3. A triaxis vibration sensor could convert reflected acoustic signals into electrical signals relating to three orthogonal accelerations, providing information useful in separating received signals by direction of arrival and discriminating between compression and shear waves.

In order to prevent the high pressure drilling mud escaping from the interior of the drill 25 annular seals are provided between all of the parts arranged for relative movement and, as is well known in the art, these seals can be pressure and volume compensated and protected from the abrasive effects of the drilling mud.

The telescopic compliant section 33 of the probe 27 is only shown as an exemplary bellows type telescoping section, but it could of course be realised in other ways such as relatively sliding telescopic tubes.

The socket 28 receiving the probe 27 is hollow in the example and could be filled with non-conductive fluid if desired to increase its elastic stability and its resistance to penetration by the high pressure mud flow around it.

The locking mechanism 30 securing the probe 27 in the socket 28 need not be releasable but it is convenient for it to be releasable in order to allow easy dismantling and servicing of the equipment.

If desired relative movement of the probe 27 and socket 28 could be absorbed by a compliance situated within the socket 28 instead of having a complaint telescopic section in the probe 27.

Instead of being mounted on the MWD tool 5 as shown the probe 27 could be an extension of the electrical cable carrier 26, the spider 31 and threaded joint 32 would then not be necessary. In this case the slip ring connectors 29 would be necessary to allow relative rotational movement of the probe 27 and socket 28 when the MWD tool 5 was attached to the drill collar 1A.

Referring to FIGS. 3a to 3c an alternative arrangement of measuring while drilling (MWD) tool 50 is shown in detail. The FIGS. 3a to 3c are cross-sections through the drill arranged from the bottom of the drill upwards.

The MWD tool 50 is attached in the same way as in the previous example by a first conventional conical screw threaded joint 50C at its upper end to the bottom of the drill collar 1A and is attached by a second conventional screw threaded joint 50D at its lower end to the drill bit 3. The MWD tool 50 comprises a first hollow member 50A mounting the drill bit throughout its lower end by the conventional conical threaded joint 50D, and a second hollow substantially cylindrical member 50B which is attached to the lower end of the drill collar 1A by the conventional conical screw threaded joint 50C. The first hollow member 50A surrounds the second hollow member 50B for a portion of its length.

The first and second hollow cylindrical members 50A and 50B have co-operating longitudinal splines 51 on their inner and outer surfaces respectively allowing them to slide axially relative to one another but still allowing large rotational loads to be transmitted along the drill collar 1 through the two members 50A and 50B to the drill bit during drilling.

Relatively axial sliding movement of the first and second cylindrical members 50A and 50B is limited by a pair of stop rings 52A and 52B attached to the first and second cylindrical members 50A and 50B respectively. The stop rings 52A and 52B set the maximum and minimum lengths of the overall MWD tool 50 assembly. An annular compliant member 53 is mounted between the first and second cylindrical members 50A and 50B, unlike the previous example the compliant member is not located between the stop rings.

During drilling the weight on bit (WOB) bears on the MWD tool 50, compressing the compliant member 53, and at high levels of WOB this compression is such that snubbing surfaces 52C and 52D of the first and second stop rings 52A and 52B respectively come into contact with co-operating snubbing surfaces 50E and 50F of the first and second cylindrical members 50A and 50B respectively. Once the snubbing surfaces 50E and 50F are in contact with the snubbing surfaces 52C and 52D the maximum drilling load is transmitted between the first and second members 50A and 50B to the drill bit 3. This snubbing action may be either hard or soft with another suitable compliant interface (not shown) being used if necessary. It would of course be possible to have only one of the pair of stop rings 52A and 52B contacting the appropriate one of the first and second cylindrical members 50A and 50B to carry out this snubbing action.

When it is desired to take acoustic measurements the WOB is adjusted by the drill in the usual manner so that the snubbing surfaces 50E, 50F and 52C, 52D of the first and second cylindrical members 50A and 50B and the first and second stop rings 52A and 52B respectively separate. The WOB of the drill bit 3 is then set by a force generated by the compliant member 53 onto the various elements attached to the drill bit 3 plus the weight of those elements.

In order to allow the drill bit 3 and the MWD tool 50 to be extracted from the bore hole the first and second stop rings 52A and 52B have co-operating snubbing surfaces 52E and 52F respectively which come into contact to limit the extension of the MWD tool 50. When extracting MWD tool 50 and drill bit 3 tensional loads are passed through the snubbing surfaces 52E and 52F to allow the drill string 1 to pull out the MWD tool 50 and attached drill bit 3.

During drilling large quantities of drilling fluid are passed down the inside of the drill string 1 under high pressure into the drill bit 3 and in order to allow this a continuous cylindrical fluid passage 54 passes down the centre of the MWD tool 50 and the acoustic transducer 55 is constructed as a hollow cylinder surrounding this fluid passage 54.

The acoustic transducer 55 comprises a stack 56 of annular piezoceramic elements 57 which form the electro-acoustically active parts of the transducer 55 and an annular tail mass 58. The piezoceramic elements 57 and tail mass 58 are secured rigidly together by a plurality of bolts 59 which are tightened to pre-compress the stack 56 of ceramic elements 57. The tension in the bolts is set to ensure that under normal operating conditions the ceramic stack 56 is in compression.

The acoustic transducer 55 is located between the first and second cylindrical members 50A and 50B and is prevented from moving radially relative to the first and second cylindrical members 50A and 50B by a plurality of inner elastomeric spacer rings 60 between the transducer 55 and the second cylindrical member 50B and a plurality of outer elastomeric spacer rings 61 between the acoustic transducer 55 and the first cylindrical member 50A.

The transducer 55 can be moved axially by a party of hydraulic rams 62 secured to the first cylindrical member 50A which are attached to the tail mass 58 of the transducer 55 through an annular compliant member 63. The space surrounding the acoustic transducer 55 between the first and second cylindrical members 50A and 50B is filled with an inert fluid to protect the electro-acoustically active parts of the transducer 55.

During drilling and during transport and handling of the MWD tool 50 the hydraulic rams 62 are retracted to move the acoustic transducer 55 out of contact from the first cylindrical member 50A. The acoustic transducer 55 is then supported by the elastomeric rings 60 and 61 and the compliant member 63 and as a result it is isolated from vibration and shock, preventing damage to the transducer 55 and particularly to piezoceramic elements 57.

When MWD measurements are to be carried out the hydraulic rams 62 push the transducer 55 so that its lower end 55A is brought into contact with the first cylindrical member 50A to provide good acoustic coupling between the drill bit 3 and acoustic transducer 55 by way of the first cylindrical member 50A. The acoustic transducer 55 remains acoustically isolated from the other parts of the drill string 1 by the elastomeric rings 60 and 61, and the compliant members 53 and 63.

As in the previous example electrical power and data links and annular seals are required, but it is not felt necessary to discuss these in detail since it would be clear from the preceding example how such links and seals can be achieved.

In both examples shown the MWD tool bears a male threaded joint for connection to a drill bit bearing a female threaded joint, it would of course be possible for the male and female parts of this joint to be reversed if desirable.

Other transducer geometries or arrangements besides those described could be used but those described are felt to be particularly advantageous.

Obviously other methods of securing together the elements of the acoustic transducer or indeed the entire assembly could be used.

An estimate of the useful range of movement from the compliant section of the drill tool is 10 millimeters.

The compliant member can be a single annular element or a plurality of separate elements arranged within an annular region.

If preferred, conventional shock absorbing units could be placed between MWD tool and drill collar 1 to improve the drilling performance of the drill as is known. Such shock absorbers employ resilient members which transmit the full WOB for drilling and are designed for reducing shock to the bit and MWD tool and so could not be used in place of the compliant parts of the present invention to allow WOB to be varied and provide acoustic de-coupling they also cannot be so used because they add too much mass to the bit to resonate at the desired frequency with the rock. Such conventional shock absorbing elements could however be combined with the resilient parts of the present invention in a single structure performing both functions.

In the example shown the acoustic transducer is mounted at the lower end of the MWD tool and is linked by a solid element to the drill bit 3, but it would also be possible to mount the acoustic transducer 4 at a higher position, in the MWD tool or even within a higher section in the drill collar 1A, such as the one containing the power supply, electronics and processing packages and mud pulsing device or the acoustic receiver array, if one was used. In this case the acoustic transducer could be acoustically linked to the drill bit 3 by the drill mud or could impart its acoustic energy through the drill mud into the rock rather than through the drill bit into the rock directly.

The use of rotationally symmetrical elements is convenient because this is traditional in drilling technology and facilitates the use of screw joints etc, but non rotationally symmetrical structures could be used if desired.

The acoustic transducer illustrated has a large number of piezo-ceramic discs, the number of such discs employed can be varied depending on the performance required and materials used. Generally the number of discs required will also depend of their diameter, which will often be limited by the collar diameter.

Where an array of acoustic transducers are used they can advantageously be arranged in a vertical array so that they can easily discriminate between compressional wave signals arising substantially from ahead of the drill bit, down travelling waves in the drill string and sideways received compressional and shear waves from regions not ahead of the drill bit or scattered from heterogeneities in the rock.

We claim:

1. A drilling apparatus, comprising: a drill string extending along an axis and having a drill bit for forming a borehole in rock; an acoustic transmitter for generating first acoustic signals in the rock at an end of the borehole formed by the drill bit; an acoustic receiver for receiving second acoustic signals returned from the rock; said transmitter and said receiver being mounted in the drill string; and said transmitter being operative for vibrating the drill bit to generate the first acoustic signals as axial compression waves which propagate through the rock ahead of the drill bit.

2. The apparatus as claimed in claim 1, in which the first acoustic signals also propagate as waves through the rock laterally of the drill bit.

3. The apparatus as claimed in claim 1, in which the transmitter and the receiver are the same transducer.

4. The apparatus as claimed in claim 1, in which the transmitter is releasably connected to the drill bit.

5. The apparatus as claimed in claim 1, in which the transmitter is a piezo-ceramic transducer having one face connected to the drill bit, and having an opposite face connected to a tail mass.

6. The apparatus as claimed in claim 5, in which the transmitter has mechanical resonances at two different frequencies, a first of the resonances with the drill bit, and a second of the resonances with the tail mass.

7. The apparatus as claimed in claim 5, in which the transmitter is electrically tuned to have an electrical resonance.

8. The apparatus as claimed in claim 1, in which an array of acoustic transducers is attached to the drill string to receive the second acoustic signals.

9. The apparatus as claimed in claim 8, in which the acoustic transducers are operative for discriminating among the compression waves arriving substantially from ahead of the drill bit, other waves traveling down the drill string, and still other waves received laterally of the drill bit.

10. The apparatus as claimed in claim 9, in which the acoustic transducers are arranged axially lengthwise of the drill string.

11. The apparatus as claimed in claim 8; and further comprising processing means for steering the array to look off the axis of the drill string.

12. The apparatus as claimed in claim 8, in which the acoustic transducers are accelerometers.

13. The apparatus as claimed in claim 8, in which the acoustic transducers are geo-phones in contact in contact with a wall of the borehole.

14. The apparatus as claimed in claim 8, in which the acoustic transducers are hydrophones.

15. The apparatus as claimed in claim 14, in which the hydrophones are mounted on an outer circumference of a drill collar.

16. The apparatus as claimed in claim 1; and further comprising an additional single axis vibration sensor for reception of the compression waves.

17. The apparatus as claimed in claim 1; and further comprising a three axis vibration sensor.

18. The apparatus as claimed in claim 1; and further comprising a compliant device for connecting a drill tool and the drill bit including an acoustic sensor to a drill collar, the drill tool and the drill bit having a combined mass, and the compliant device having a compliance such that a resonant frequency produced by the compliance and the mass of the drill tool and drill bit is substantially lower than a passband frequency of the transmitter.

19. A drilling apparatus comprising: a drill string having a drill bit for forming a borehole in rock; an acoustic transmitter for generating first acoustic signals in the rock about the borehole formed by the drill bit; an acoustic receiver for receiving second acoustic signals returned from the rock; said transmitter being connected to the drill bit, and being operative for vibrating the drill bit to propagate the first acoustic signals in the rock ahead of the drill bit; and said transmitter and the receiver being the same transducer.

20. The apparatus as claimed in claim 19, in which the first acoustic signals also propagate through the rock to the side of the drill bit.

21. The apparatus as claimed in claim 19, in which the transmitter is releasably connected to the drill bit.

22. The apparatus as claimed in claim 19, in which the transmitter is a piezo-ceramic transducer having one face connected to the drill bit, and having an opposite face connected to a tail mass.

23. The apparatus as claimed in claim 22, in which the transmitter has mechanical resonances at two different frequencies, a first of the resonances with the drill bit, and a second of the resonances with the tail mass.

24. The apparatus as claimed in claim 22, in which the transmitter is electrically tuned to have an electrical resonance.

25. A drilling apparatus, comprising: a drill string extending along an axis and having a drill bit for forming a borehole in rock; an acoustic transmitter for generating first acoustic signals in the rock about the borehole formed by the drill bit; an acoustic receiver for receiving second acoustic signals returned from the rock; said transmitter being connected to the drill bit, and being operative for vibrating the drill bit to propagate the first acoustic signals in the rock ahead of the drill bit; and said transmitter being a piezoceramic transducer having one face connected to the drill bit, and having an opposite face connected to a tail mass.

26. The apparatus as claimed in claim 25, in which the transmitter has mechanical resonances at two different frequencies, a first of the resonances with the drill bit, and a second of the resonances with the tail mass.

27. The apparatus as claimed in claim 25, in which the transmitter is electrically tuned to have an electrical resonance.

28. The apparatus as claimed in claim 25, in which an array of acoustic transducers is attached to the drill string to receive the second acoustic signals.

29. The apparatus as claimed in claim 28, in which the acoustic transducers are operative for discriminating among the compression waves arriving substantially from ahead of the drill bit, other waves traveling down the drill string, and still other waves received laterally of the drill bit.

30. The apparatus as claimed in claim 29, in which the acoustic transducers are arranged axially lengthwise of the drill string.

31. The apparatus as claimed in claim 28; and further comprising processing means for steering the array to look off the axis of the drill string.

32. The apparatus as claimed in claim 25; and further comprising a compliant device for connecting a drill tool and the drill bit including an acoustic sensor to a drill collar, the drill tool and the drill bit having a combined mass, and the compliant device having a compliance such that a resonant frequency produced by the compliance and the mass of the drill tool and drill bit is substantially lower than a passband frequency of the transmitter.

33. The apparatus as claimed in claim 25, in which the transmitter and the receiver are the same transducer.

34. The apparatus as claimed in claim 25, in which the transmitter is releasably connected to the drill bit.

35. A drilling apparatus comprising: a drill string having a drill bit for forming a borehole in rock; an acoustic transmitter for generating first acoustic signals in the rock about the borehole formed by the drill bit; an acoustic receiver for receiving second acoustic signals returned from the rock; said transmitter being connected to the drill bit, and being operative for vibrating the drill bit to propagate the first acoustic signals in the rock ahead of the drill bit; and a compliant device for connecting a drill tool and the drill bit including an acoustic sensor to a drill collar, the drill tool and the drill bit having a combined mass, the compliant device having a compliance such that a resonant frequency produced by the compliance and the mass of the drill tool and drill bit is substantially lower than a passband frequency of the transmitter.

* * * * *